Patented Oct. 26, 1954

2,692,893

UNITED STATES PATENT OFFICE 2,692,893

METHOD OF PREPARING DIALKYL CHLOROTHIOPHOSPHATES

Ingenuin Hechenbleikner, Stamford, Conn., assignor to American Cyanamid Company, New York, N. Y., a corporation of Maine No Drawing. Application April 5, 1952, Serial No. 280,850

4 Claims. (Cl. 260—461)

The present invention relates to a method of preparing organic chlorothiophosphates, particularly those which conform to the general formula

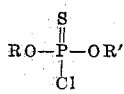

wherein R and R' represent alkyl radicals. As such it constitutes a continuation-in-part of my copending application for U. S. Letters Patent, Serial No. 740,265, filed April 8, 1947, now abandoned. In the above formula, R and R' represent straight chain or branched chain alkyl radicals containing up to eight carbon atoms. Typical examples are compounds in which R and R' are methyl, ethyl, n-propyl, isopropyl, n-butyl, sec.-butyl, isobutyl, n-amyl, n-hexyl, 2-ethylhexyl and n-octyl radicals. Generally, but not necessarily, R and R' are identical.

Very little mention is made of the O,O-dialkyl chlorothiophosphates in the literature. While Mastin, Norman and Weilmuenster did prepare O,O-diethyl chlorothiophosphate from absolute ethanol and thiophosphoryl chloride, using pyridine as a hydrogen chloride acceptor, J. Am. Chem. Soc. 67, 1662 (1945), the yield was only 24.4%. Very little else has been previously known about these compounds.

Nevertheless, considerable interest in these compounds has recently developed due to their utility as intermediate products in the production of insecticidal compositions, flotation agents and rubber accelerators. The value of these O,O-dialkyl chlorothiophosphates as chemical intermediates, and particularly the O,O-diethyl chlorothiophosphate, may be better understood by referring to their use in the synthesis of highly active insecticides. For example, O,O-diethyl O-paranitrophenyl thiophosphate, an outstanding insecticide with a wide range of applicability for the control of practically every species of insect, may be prepared by reacting together equal molar quantities of O,O-diethyl chlorothiophosphate and an alkali metal paranitrophenolate. Accordingly, some better method of preparing the dialkyl chlorothiophosphate compounds has become desirable.

It is, therefore, a principal object of the present invention to devise a simple, economical method by which the O,O-dialkyl chlorothiophosphates may be obtained in good yields.

In accordance with the present invention this object is accomplished by causing two molar equivalents of a dithiophosphate compound of the general formula

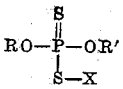

in which R and R' have the meaning shown above and X represents a member of the group consisting of hydrogen and the alkali metals, to react with three molar equivalents of chlorine.

A typical reaction in which O,O-diethyl dithiophosphoric acid is reacted with chlorine to produce O,O-diethyl chlorothiophosphate may be illustrated as follows:

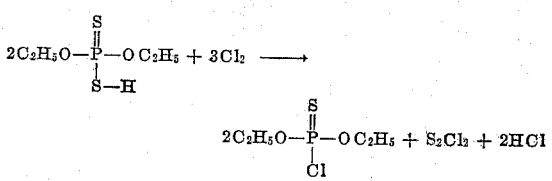

In the practice of the present invention, it is essential that the dialkyl dithiophosphate (dialkyl dithiophosphoric acid or its alkali metal salt) and the chlorine be brought together substantially in the proportion of two molar equivalents of the dithiophosphate to three molar equivalents of the chlorine. Moreover, as shown above, for every mole of the O,O-dialkyl chlorothiophosphate obtained, approximately one-half mole of sulfur monochloride is produced.

Separation of the sulfur monochloride by-product from the chlorothiophosphate compound may be carried out in any desired manner. Suitable methods include direct distillation and water hydrolysis. Direct distillation involves fractional separation by first distilling off the sulfur monochloride followed by collection of the chlorothiophosphate compound by distillation under reduced pressure. Water hydrolysis is carried out by slowly pouring the crude reaction mixture into water with good agitation. Any sulfur monochloride is hydrolyzed to water soluble acids, namely hydrochloric acid and thiosulfurous acid. Stirring is discontinued and the mixture stratifies into two layers. The lower layer containing the O,O-dialkyl chlorothiophosphate is removed and distilled.

However, hydrolysis of the sulfur monochloride in the crude reaction mixture frequently produces some free sulfur. The latter may take a number of forms including crystals, colloidal particles, or syrupy, plastic semi-solids. Particularly in a large commercial operation, such material may cause considerable difficulty in the separation and removal of the layer containing the O,O-dialkyl chlorothiophosphate. For this reason a third modification or sulfite hydrolysis is preferred. Precipitation of sulfur can be completely eliminated by carrying out the hydrolysis in water containing about three molar equivalents of sodium sulfite per mole of sulfur monochloride in the crude reaction mixture.

Considerable care must be exercised in maintaining a suitable reaction temperature. Particularly in the early stages of the process, the reaction is somewhat exothermic and cooling means may be necessary. The reaction should be carried out at a temperature within the range of from about 0° to 60° C., and preferably from about 10° to 40° C. A period of from about one to two hours is usually sufficient for the reaction to reach completion.

The alkali metal salts of the dialkyl dithiophosphoric acids, for example, sodium O,O-diethyl dithiophosphate, are solid materials. When such compounds are utilized in the process, it is advantageous to employ an inert organic solvent. Solvents suitable for the purpose are carbon tetrachloride, chloroform, benzene, toluene, xylene, chlorobenzene, tetrachloroethane, methylene chloride, ethylene dichloride and the like. These inert solvents may also be employed in the process when a dialkyl dithiophosphoric acid, for example, O,O-diethyl dithiophosphoric acid, is reacted with chlorine.

Dithiophosphate compounds such as are employed in the process of the present invention as shown above, namely, the dialkyl dithiophosphoric acids and alkali metal salts thereof, may be prepared according to methods described in U. S. Patent No. 1,893,018.

The following examples will further illustrate the invention.

Example 1

A mixture consisting of 208 g. (1.0 mole) of sodium O,O-diethyl dithiophosphate and 500 cc. of carbon tetrachloride was stirred and cooled below 20° C. 110 g. (1.55 moles) of chlorine were distilled into the mixture during a period of about 2 hours, the temperature of the reaction mixture being maintained between 10° and 20° C. The cold reaction mixture was added to a liter of ice water, and stirred for ½ hour. The mixture stratified into two layers. The lower layer was removed and distilled under reduced pressure. 150 g. of O,O-diethyl chlorothiophosphate, a colorless liquid boiling at 49°–50° C./1 mm., were obtained. The yield was 80% based upon the weight of sodium O,O-diethyl dithiophosphate used.

Example 2

A mixture consisting of 67.2 g. (0.30 mole) of potassium O,O-diethyl dithiophosphate and 100 cc. of carbon tetrachloride was stirred and cooled to about 15° C. 32 g. (0.45 mole) of chlorine were distilled into the mixture during a period of about 2 hours, the temperature of the reaction mixture being maintained between 15° and 20° C. The cold reaction mixture was filtered to remove the precipitated potassium chloride, and the filtrate was distilled under reduced pressure. A yield of 81% of O,O-diethyl chlorothiophosphate was obtained.

Example 3

The procedure of Example 1 was employed using 380 g. (2.04 moles) of O,O-diethyl dithiophosphoric acid, 500 cc. of carbon tetrachloride, and 220 g. (3.1 moles) of chlorine. A yield of 72% of O,O-diethyl chlorothiophosphate was obtained.

Example 4

220 g. of chlorine were distilled slowly into 380 g. of O,O-diethyl dithiophosphoric acid, the reaction mixture being stirred and the temperature maintained between 10° and 20° C. by means of an ice bath. The cold solution was then mixed with a liter of ice water, and stirred for ½ hour. The mixture stratified into two layers. The lower layer was removed and distilled under reduced pressure. A yield of 74.5% of O,O-diethyl chlorothiophosphate was obtained.

Example 5

The procedure of Example 1 was employed using 158 g. (1.0 mole) of O,O-dimethyl dithiophosphoric acid, 50 cc. of benzene, and 110 g. (1.55 moles) of chlorine. A yield of 58% of O,O-dimethyl chlorothiophosphate was obtained. The product was a colorless liquid boiling at 40° C./1 mm.

Example 6

The procedure of Example 1 was employed using 214 g. (1.0 mole) of O,O-di-isopropyl dithiophosphoric acid, 100 cc. of carbon tetrachloride and 110 g. (1.55 moles) of chlorine. 130 g. of O,O-di-isopropyl chlorothiophosphate, a colorless liquid boiling at 55° C./.5 mm. were obtained.

Example 7

The procedure of Example 4 was employed using 242 g. (1.0 mole) of O,O-di-n-butyl dithiophosphoric acid and 110 g. (1.55 moles) of chlorine. A yield of 82% of O,O-di-n-butyl chlorothiophosphate was obtained. The product was a colorless liquid boiling at 75° C./1 mm.

Example 8

The procedure of Example 1 was employed using 354 g. (1.0 mole) of O,O-di(2-ethylhexyl) dithiophosphoric acid, 100 cc. of carbon tetrachloride, and 110 g. (1.55 moles) of chlorine. A yield of 90% of O,O-di(2-ethylhexyl) chlorothiophosphate was obtained. The product was a light yellow liquid which decomposed when distillation was attempted.

Example 9

220 g. (3.1 moles) of chlorine were distilled into 372 g. (2.0 moles) of O,O-diethyl dithiophosphoric acid during a period of 2 hours and 40 minutes. The mixture was stirred during the addition of the chlorine, and the temperature was held at about 20° C. by means of an ice bath. The reaction mixture was divided into two equal parts. One portion was slowly added with stirring to a mixture consisting of 200 g. of sodium sulfite and 600 cc. of water maintained between 20° and 25° C. The mole ratio was 3.17 moles of $Na_2SO_3$ to 1.0 mole of $S_2Cl_2$. The organic layer was removed and distilled under reduced pressure, giving 154 g. (81.7% yield) of O,O-diethyl chlorothiophosphate. The other portion of the reaction mixture was subjected to vacuum distillation, giving 140 g. (74% yield) of the product.

As illustrated in the above examples, the O,O-dialkyl chlorothiophosphate compounds are obtained by the reaction in which two molar equivalents of the O,O-dialkyl dithiophosphate (dialkyl dithiophosphoric acid or an alkali metal salt thereof) and three molar equivalents of chlorine are utilized. It is necessary that the reactants be employed in this molar ratio, otherwise compounds of a decidedly different structure and character may be formed. For example, a bis-(dialkyl thiophosphono) sulfide compound, useful as an accelerator in the vulcanization of rubber and disclosed in U. S. Patent No. 1,949,629, may be prepared by reacting two molar equivalents of an O,O-dialkyl dithiophosphate with one molar equivalent of chlorine.

While the invention has been described with particular reference to specific embodiments, it is to be understood that it is not to be limited thereto but is to be construed broadly and restricted solely by the scope of the appended claims.

I claim:

1. A method of preparing a dialkyl chlorothiophosphate of the general formula

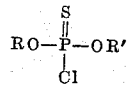

wherein R and R' represent alkyl radicals containing not more than eight carbon atoms, which comprises: bringing together two molar equivalents of a dialkyl dithiophosphate of the formula

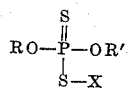

in which X is chosen from the group consisting of hydrogen and the alkali metals, and three molar equivalents of chlorine in the absence of water; maintaining the temperature of the mixture between about 0° and 60° C. until reaction substantially ceases, and recovering thus formed dialkyl chlorothiophosphate.

2. The method of claim 1 in which the dialkyl dithiophosphate and chlorine are brought together in an inert organic solvent.

3. A method of preparing a dialkyl chlorothiophosphate of the general formula

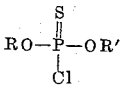

wherein R and R' represent alkyl radicals containing not more than eight carbon atoms, which comprises: bringing together two molar equivalents of a dialkyl dithiophosphate of the formula

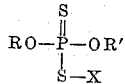

in which X is chosen from the group consisting of hydrogen and the alkali metals, and three molar equivalents of chlorine in the absence of water; maintaining the temperature of the mixture between about 0° and 60° C. until reaction substantially ceases; adding the resulting mixture containing thus formed dialkyl chlorothiophosphate and sulfur monochloride to an aqueous solution of sodium sulfite, and recovering the dialkyl chlorothiophosphate.

4. A method of preparing O,O-diethyl chlorothiophosphate which comprises: bringing together two molar equivalents of O,O-diethyl dithiophosphoric acid and three molar equivalents of chlorine in the absence of water; maintaining the temperature of the mixture between about 0° and 60° C. until reaction substantially ceases; adding the resulting mixture containing thus formed O,O-diethyl chlorothiophosphate and sulfur monochloride to an aqueous solution of sodium sulfite, and recovering the O,O-diethyl chlorothiophosphate.

References Cited in the file of this patent

UNITED STATES PATENTS

| Number | Name | Date |
| --- | --- | --- |
| 2,060,815 | MacAfee | Nov. 17, 1936 |
| 2,482,063 | Hechenbleikner | Sept. 13, 1949 |